US012607280B2

(12) United States Patent
Owoeye et al.

(10) Patent No.: US 12,607,280 B2
(45) Date of Patent: Apr. 21, 2026

(54) THREADED CONNECTION

(71) Applicant: Saudi Arabian Oil Company, Dhahran (SA)

(72) Inventors: Oladele Owoeye, Dhahran (SA); Jasem Moyaibed, Tarut (SA)

(73) Assignee: Saudi Arabian Oil Company, Dhahran (SA)

( * ) Notice: Subject to any disclaimer, the term of this patent is extended or adjusted under 35 U.S.C. 154(b) by 287 days.

(21) Appl. No.: 18/111,061

(22) Filed: Feb. 17, 2023

(65) Prior Publication Data

US 2024/0280194 A1 Aug. 22, 2024

(51) Int. Cl.
| *F16L 15/06* | (2006.01) |
| *F16L 15/00* | (2006.01) |
| *E21B 17/042* | (2006.01) |

(52) U.S. Cl.
CPC .............. *F16L 15/06* (2013.01); *F16L 15/007* (2013.01); *F16L 15/008* (2013.01); *E21B 17/042* (2013.01)

(58) Field of Classification Search
CPC ....... F16L 15/007; F16L 15/008; F16L 15/06; E21B 17/042
See application file for complete search history.

(56) References Cited

U.S. PATENT DOCUMENTS

| 349,146 A | * | 9/1886 | Duff ...................... F16L 15/008 |
| | | | 285/369 |
| 2,772,102 A | | 11/1956 | Webb |

| 2,992,019 A | 7/1961 | MacArthur |
| 3,109,672 A | 11/1963 | Franz |
| 3,467,413 A | 9/1969 | Madrelle |
| 4,384,737 A | 5/1983 | Reusser |
| 4,458,925 A | 7/1984 | Raulins et al. |

(Continued)

FOREIGN PATENT DOCUMENTS

| CN | 201121782 | 9/2008 |
| EP | 1101057 | 10/2006 |

(Continued)

OTHER PUBLICATIONS

Dong et al., "Design and Mechanical Behavior Study of Ultrahigh-Torque Variable Pitch Casing Joint," Advances in Mechanical Engineering, Jan. 2019, 11(1):1-12.

(Continued)

*Primary Examiner* — David Bochna
(74) *Attorney, Agent, or Firm* — Fish & Richardson P.C.

(57) ABSTRACT

A pipe assembly includes a first pipe, a second pipe, and a collar. The first pipe has a first external thread and a first rim that has a bearing surface. The second pipe has a second external thread and a second rim that has a bearing surface. The collar is threadedly coupled to the first pipe and the second pipe to form a threaded connection. The collar has a first internal thread that corresponds with the first external thread, and a second internal thread that corresponds with the second external thread. The collar has an inwardly-projecting annular shoulder residing between the first internal thread and the second internal thread. The shoulder has two bearing surfaces that face away from each other and each bear, with the threaded connection formed, against a respective one of the bearing surfaces of the first and second rims.

24 Claims, 4 Drawing Sheets

(56) References Cited

U.S. PATENT DOCUMENTS

| | | | | |
|---|---|---|---|---|
| 4,473,245 | A * | 9/1984 | Raulins | F16L 15/04 |
| | | | | 285/332.3 |
| 4,538,840 | A | 9/1985 | DeLange | |
| 4,564,225 | A | 1/1986 | Taylor | |
| 4,598,455 | A | 7/1986 | Morris et al. | |
| 4,616,537 | A | 10/1986 | Axford et al. | |
| 4,712,815 | A * | 12/1987 | Reeves | F16L 15/004 |
| | | | | 285/379 |
| 4,728,129 | A | 3/1988 | Morris et al. | |
| 4,732,416 | A | 3/1988 | Dearden | |
| 4,786,090 | A | 11/1988 | Mott | |
| 4,795,200 | A | 1/1989 | Tung | |
| 4,796,923 | A | 1/1989 | Liggins | |
| 4,893,844 | A | 1/1990 | Chelette | |
| 4,988,127 | A * | 1/1991 | Cartensen | F16L 15/008 |
| | | | | 285/94 |
| 5,040,827 | A | 8/1991 | DeLange | |
| 5,064,224 | A | 11/1991 | Tai | |
| 5,212,885 | A | 5/1993 | Buonodono et al. | |
| 5,360,239 | A | 11/1994 | Klementich | |
| 5,429,374 | A | 7/1995 | Eichenberger | |
| 5,687,999 | A | 11/1997 | Lancry et al. | |
| 6,158,785 | A | 12/2000 | Beaulier et al. | |
| 6,604,761 | B1 * | 8/2003 | Debalme | F16L 47/16 |
| | | | | 285/55 |
| 6,811,189 | B1 * | 11/2004 | DeLange | F16L 15/009 |
| | | | | 285/332.1 |
| 7,578,043 | B2 | 8/2009 | Simpson et al. | |
| 7,850,211 | B2 | 12/2010 | Reynolds, Jr. et al. | |
| 7,997,627 | B2 | 8/2011 | Sugino et al. | |
| 8,029,025 | B1 | 10/2011 | Sivley, IV et al. | |
| 8,136,846 | B2 * | 3/2012 | Church | E21B 17/042 |
| | | | | 285/333 |
| 8,882,157 | B2 | 11/2014 | Chelette et al. | |
| 9,677,346 | B2 | 6/2017 | Hou et al. | |
| 10,443,318 | B2 | 10/2019 | Finke | |
| 11,053,749 | B2 | 7/2021 | Kawai | |
| 11,353,144 | B2 | 6/2022 | Kawai | |

| | | | | |
|---|---|---|---|---|
| 2003/0132632 | A1 * | 7/2003 | Schoonen | F16L 15/008 |
| | | | | 285/333 |
| 2004/0017081 | A1 | 1/2004 | Simspon et al. | |
| 2004/0104575 | A1 | 6/2004 | Ellington et al. | |
| 2004/0174017 | A1 | 9/2004 | Brill et al. | |
| 2007/0063517 | A1 | 3/2007 | Pallini et al. | |
| 2007/0132239 | A1 | 6/2007 | Reynolds. Jr. | |
| 2007/0164565 | A1 | 7/2007 | Evans et al. | |
| 2010/0181727 | A1 | 7/2010 | Santi et al. | |
| 2012/0032435 | A1 | 2/2012 | Carcagno | |
| 2014/0084582 | A1 | 3/2014 | Elder et al. | |
| 2015/0316181 | A1 | 11/2015 | Tejeda et al. | |
| 2016/0130885 | A1 | 5/2016 | Liu et al. | |
| 2016/0312931 | A1 * | 10/2016 | Martin | F16L 15/001 |
| 2017/0114942 | A1 | 4/2017 | McLaughlin | |
| 2018/0252343 | A1 | 9/2018 | Evans et al. | |
| 2018/0328119 | A1 | 11/2018 | Juarez | |
| 2019/0056049 | A1 * | 2/2019 | Kawai | F16L 15/04 |
| 2019/0211631 | A1 | 7/2019 | Yamaguchi | |
| 2020/0278056 | A1 | 9/2020 | Oku et al. | |
| 2020/0332930 | A1 | 10/2020 | Wajnikonis | |
| 2021/0317856 | A1 | 10/2021 | Harvey et al. | |
| 2022/0341519 | A1 | 10/2022 | Larson | |
| 2023/0072067 | A1 | 3/2023 | Wajnikonis | |
| 2023/0349241 | A1 | 11/2023 | Owoeye et al. | |
| 2023/0408000 | A1 * | 12/2023 | Owoeye | E21B 17/0423 |
| 2024/0044426 | A1 * | 2/2024 | Owoeye | F16L 15/002 |
| 2024/0183228 | A1 | 6/2024 | Owoeye et al. | |

FOREIGN PATENT DOCUMENTS

| | | |
|---|---|---|
| WO | WO 1993018330 | 9/1993 |
| WO | WO 2019055295 | 3/2019 |

OTHER PUBLICATIONS

Zhang et al., "Experimental Research on Connection Performance of Variable-Pitch Threaded Casing," Advanced Materials Research, Sep. 2013, 805-806:1805-1811.

* cited by examiner

Connect a first pipe to a collar by threadedly coupling the first external thread to the first internal thread to form a first seal

410

Connect a second pipe to the collar by threadedly coupling the second external thread to the second internal thread to forms a second seal

THREADED CONNECTION

FIELD OF THE DISCLOSURE

This disclosure relates to tubular connections.

BACKGROUND OF THE DISCLOSURE

Tubing assemblies and wellbore strings such as production strings direct fluid between a terranean surface of a wellbore and a downhole location of the wellbore. During drilling, production, wellbore stimulation, or other wellbore operations, a wellbore string can leak fluid through one or more of its connections. Mechanical issues can lead to leakage of fluid out of or into the wellbore string, which can lead to damage and other problems that are costly to fix.

SUMMARY

Implementations of the present disclosure include pipe assembly that includes a first pipe that has a first external thread and a first rim that has a bearing surface. The pipe assembly has a second pipe with a second external thread and a second rim that has a bearing surface. The pipe assembly also has a collar that is threadedly coupled to the first pipe and the second pipe to form a threaded connection. The collar has a first internal thread that corresponds with (and is threadedly coupled to) the first external thread. The collar also has a second internal thread that corresponds with (and is threadedly coupled to) the second external thread. The collar has an inwardly-projecting annular shoulder residing between the first internal thread and the second internal thread. The shoulder has two bearing surfaces that face away from each other and each bear, with the threaded connection formed, against a respective one of the bearing surfaces of the first and second rims.

In some implementations, the first pipe, the second pipe, and the collar are made of a non-metallic material. In some implementations, the non-metallic material includes at least one of reinforced fiber glass or carbon fibers.

In some implementations, the first and second external threads each include a last thread opposite the respective rims of the first and second pipes. Each last thread defines, in cross section, a height greater than a height of a rest of the first and second external threads. In some implementations, the first and second external threads include a crest of constant diameter along a length of the first and second external threads up to the last thread. In some implementations, each last thread includes a height that is at least 0.001 inches greater than a height of the rest of the first and second external threads.

In some implementations, the pipe assembly includes two external seal rings. Each of the two external seal rings reside between external surfaces of the first and second pipes and respective internal surfaces of the collar to form a seal. The two external seal rings prevent, with the internal seal rings, fluid from flowing across the threaded connection.

In some implementations, the first and second external threads include chamfered crests and the first and second internal threads includes chamfered crests.

In some implementations, the first and second external threads each includes a multi-start thread with two or more thread starts. The collar includes a corresponding number of thread starts, allowing the first and second pipes to threadedly engage the collar with less than one complete turn.

In some implementations, the first and second threads each include a width that increases from the respective rim to a last thread of the first and second threads. In some implementations, the width increases uniformly across a length of the first and second threads.

In some implementations, each bearing surface of the shoulder includes an internal seal ring configured to bear against and form, with the threaded connection formed, a seal with a respective one of the first and second rims. The internal seal rings form a dual seal with the respective rims.

In some implementations, the inwardly-projected shoulder defines, in cross-sectional side view, a tapered surface. Each of the internal seal rings includes a trapezoidal cross-section defining a leg side tapered to correspond with the tapered surface of the inwardly-projected shoulder.

In some implementations, the pipe assembly further includes a dope pocket at a first thread of the first and second internal threads. The dope pocket retains lubricant to release stress from the first internal thread during make up of the threaded connection.

In some implementations, each of the first and second external threads include a square thread slanted with respect to a plane orthogonal to a central longitudinal axis of the first and second pipes. The square thread has a load flank that defines an angle of between negative 0.1° and negative 10° with respect to the plane and a stab flank that defines an angle of between 5° and 15° with respect to the plane.

Implementations of the present disclosure also include an assembly that includes a tubular body threadedly coupled to a first pipe and a second pipe. The first pipe has a first rim and the second pipe has a second rim. The tubular body has a first internal thread, a second internal thread, and an inwardly-projecting annular shoulder residing between the first internal thread and the second internal thread. The inwardly-projecting annular shoulder has two bearing surfaces that face away from each other and each bear, with the connection formed, against a respective one of the first and second rims.

In some implementations, each bearing surface includes an annular seal element that bears against and forms, with the threaded connection formed, a seal with a respective one of the first and second rims.

In some implementations, the assembly includes two external seal rings. Each of the two external seal rings resides between external surfaces of the first and second pipes and respective internal surfaces of the collar to form a seal. The two external seal rings prevent, with the connection formed, fluid from flowing across the connection.

Implementations of the present disclosure include a method that includes connecting a first pipe to a collar. The first pipe includes a first external thread and a first rim. The collar has a first internal thread, a second internal thread, and an inwardly-projecting annular shoulder that resides between the first internal thread and the second internal thread. The shoulder has two bearing surfaces facing away from each other. Connecting the first pipe to the collar includes threadedly coupling the first external thread to the first internal thread such that a bearing surface of the first rim forms, with one of the two bearing surfaces of the shoulder, a first seal. The method also includes connecting a second pipe to the collar. The second pipe has a second external thread and a second rim. Connecting the second pipe to the collar includes threadedly coupling the second external thread to the second internal thread of the collar such that a bearing surface of the second rim forms, with the other one of the two bearing surfaces of the shoulder, a second seal.

In some implementations, connecting the first pipe includes turning the first pipe with respect to the collar until the first rim bears against the one of the seal rings and an external seal ring residing at an external surface of the first pipe forms a seal with an internal surface of the collar.

BRIEF DESCRIPTION OF THE DRAWINGS

FIG. 4 is a front schematic view of a pipe with two thread starting locations.

FIG. 5 is a front schematic view of a pipe with three thread starting locations.

FIG. 6 is a front schematic view of a pipe with four thread starting locations.

DETAILED DESCRIPTION OF THE DISCLOSURE

The present disclosure describes a pipe assembly with a buttress connection. The buttress connection has two non-metallic pipes and a non-metallic coupling or collar that joins the two pipes. The last thread of each pipe has a height that is greater than the rest of its threads. The coupling also has a mid-shoulder that stops the rims of both pipes, increasing the torsional capacity of the connection. The mid-shoulder has sealing rings on both bearing surfaces of the mid-shoulder to bear against and form a dual seal with the rims of the two pipes.

Particular implementations of the subject matter described in this specification can be implemented so as to realize one or more of the following advantages. For example, the pipe assembly of the present disclosure can prevent galling, cross threading, and thread jumping out. The pipe assembly of the present disclosure also prevents fluid from flowing across the connection.

Figure 1:
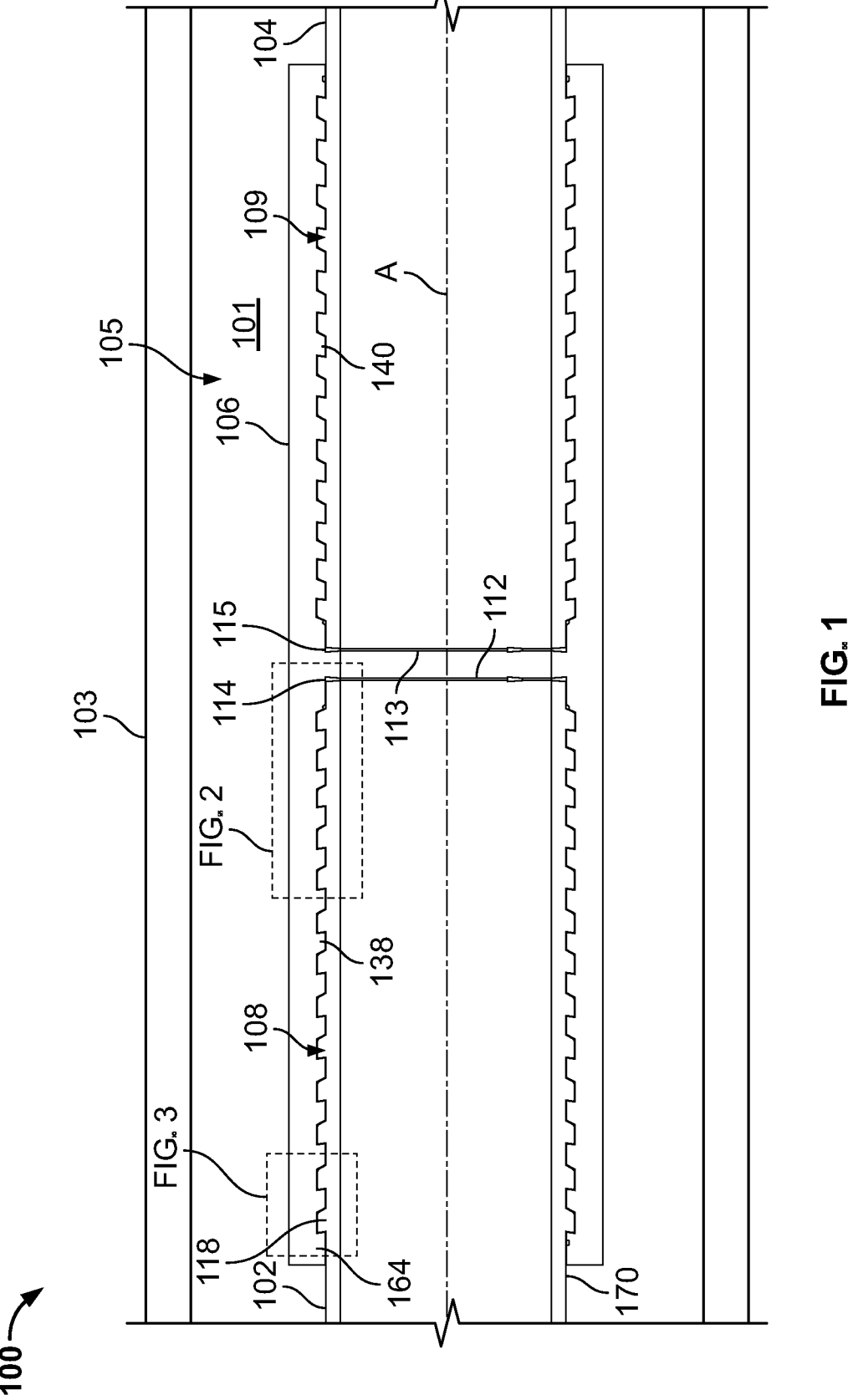
FIG. 1 is a side, cross-sectional schematic view of a pipe assembly according to implementations of the present disclosure.

FIG. 1 shows a pipe assembly 100 (e.g., a tubular assembly or a wellbore assembly) disposed within a wellbore 103 and defining, with a wall of the wellbore 103, an annulus 101. The pipe assembly 100 has a first pipe 102, a second pipe 104, and a collar 106 (e.g., a coupling). The first pipe 102 and second pipe 104 are threadedly attached to opposite sides of the collar 106 to form a connection 105. The pipes 102, 104 and collar 106 can be used is a variety of applications, such as in oil and gas production (e.g., as part of a production or injection string) and in refineries. The first pipe 102, second pipe 104, and collar 106 can be made of a metallic or non-metallic material such as reinforced fiberglass or carbon fibers.

The first pipe 102 has a first external thread 108 and a first rim 112. The external thread 108 can have a constant outer diameter up to its last thread 118. For example, the external thread 108 can be straight, having a crest of constant diameter along a length of the first external thread 108 up to its last thread 118. The crest and root of the first pipe 102 have a constant diameter that extends parallel with respect to longitudinal axis "A." Referring also to FIG. 3, the last thread 118 has a slightly larger diameter than the rest of the thread 108. For example, the thread has a height "i" up to the last thread 118, and the last thread 118 has a height "h"

greater than height "i." Height "h" can be, for example, 0.001 inches or greater (e.g., 0.002 inches, 0.003 inches, etc.) than height "i."

Figure 3:
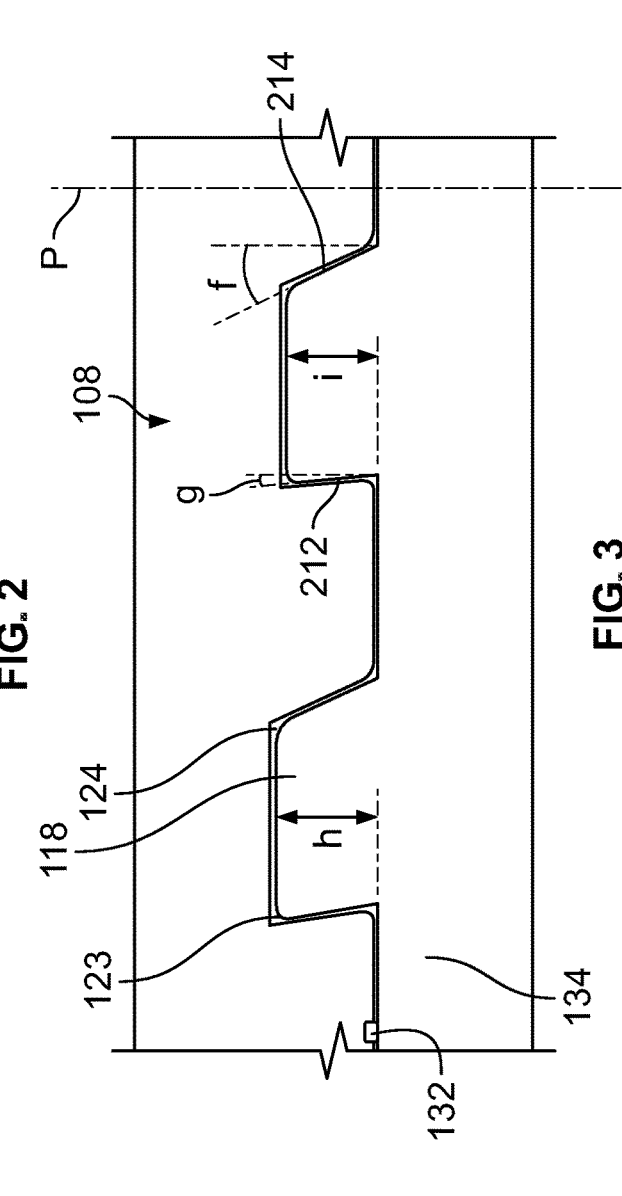
FIG. 3 is a detailed view of a second section of the pipe assembly in FIG. 1.

Still referring to FIG. 3, the external thread 108 can be a square thread that is slightly slanted with respect to a plane "P." Plane "P" is orthogonal to the central longitudinal axis "A" of the first and second pipes. The square thread has a load flank 212 that defines an angle "g" of between negative 0.1° and negative 10° (e.g., negative 5°) with respect to the plane "P" and a stab flank 214 that defines an angle "f" of between 5° and 15° (e.g., positive 10°) with respect to the plane "P."

Additionally, the external thread 108 has rounded chamfers 123, 124 at the crest in both the load flank edge 212 and the stab flank edge 214. The rounded chamfer extends across the entire thread and helps reduce galling tendencies. The collar 106 can also have chamfered edges at the crest on both flank sides.

Figure 2:
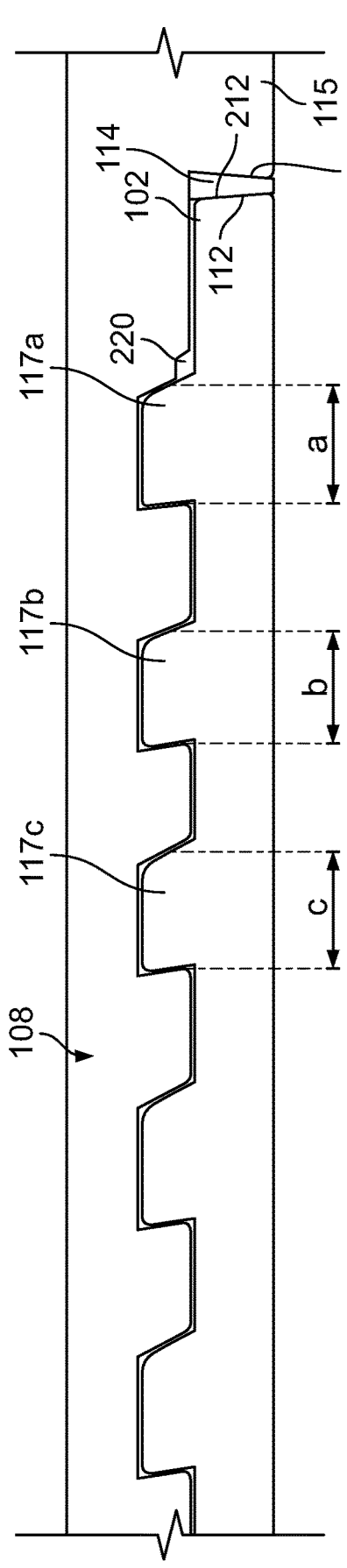
FIG. 2 is a detailed view of a first section of the pipe assembly in FIG. 1.

Referring also to FIG. 2, the external thread 108 has a width that increases from the rim 112 to the last thread 118. For example, the first thread 117 (e.g., the leading thread) has a width "a" that is less than a width "b" of the second thread 117b, width "b" is less than a width "c" of the third thread 107c, and so on, to the last thread 118. In some cases, the width of the external thread 108 increases uniformly across the length of the thread 108. For example, width "b" can be 0.01 inches greater than width "a," width "c" can be 0.01 inches greater than width "b," and so on.

Still referring to FIG. 2, the rim 112 of the first pipe 102 has a bearing surface 213 that bears against a mid-shoulder 115 (e.g., an inwardly-projecting annular shoulder) of the collar 106 to form a seal. The bearing surface 213 can be the surface of a seal ring 114 (e.g., O-ring) or the surface of the rim 112. For example, if each rim (instead of the shoulder 115) has the seal ring 114, the bearing surface of each pipe 102, 104 is the surface of the seal ring 114 that contacts the shoulder 115. However, if the seal ring is attached to the shoulder 115, the bearing surface of the pipes 102, 104 is surface of the rim of the pipes 102, 104 that bears against the shoulder 115. When the threaded connection is formed, the bearing surface 213 forms, with the shoulder 115, a seal that prevents fluid from flowing across the threaded connection. In other words, the seal prevents fluid from flowing across the threads 108 to exit or enter the pipe 102.

In some implementations, the shoulder 115 defines, in cross-sectional side view, a tapered or angled bearing surface 119. Each of the internal seal rings 114 can have a trapezoidal (or other polygonal shape) cross-section defining a leg side tapered to correspond with the tapered surface 119 of the shoulder 115.

The coupling has an annular groove 220 that forms a dope pocket at the beginning of the external threads 108 to reduce the stress of the mating faces. For example, the dope pocket retains lubricant to release stress from the thread during makeup of the threaded connection.

Figures 4, 5, 6:
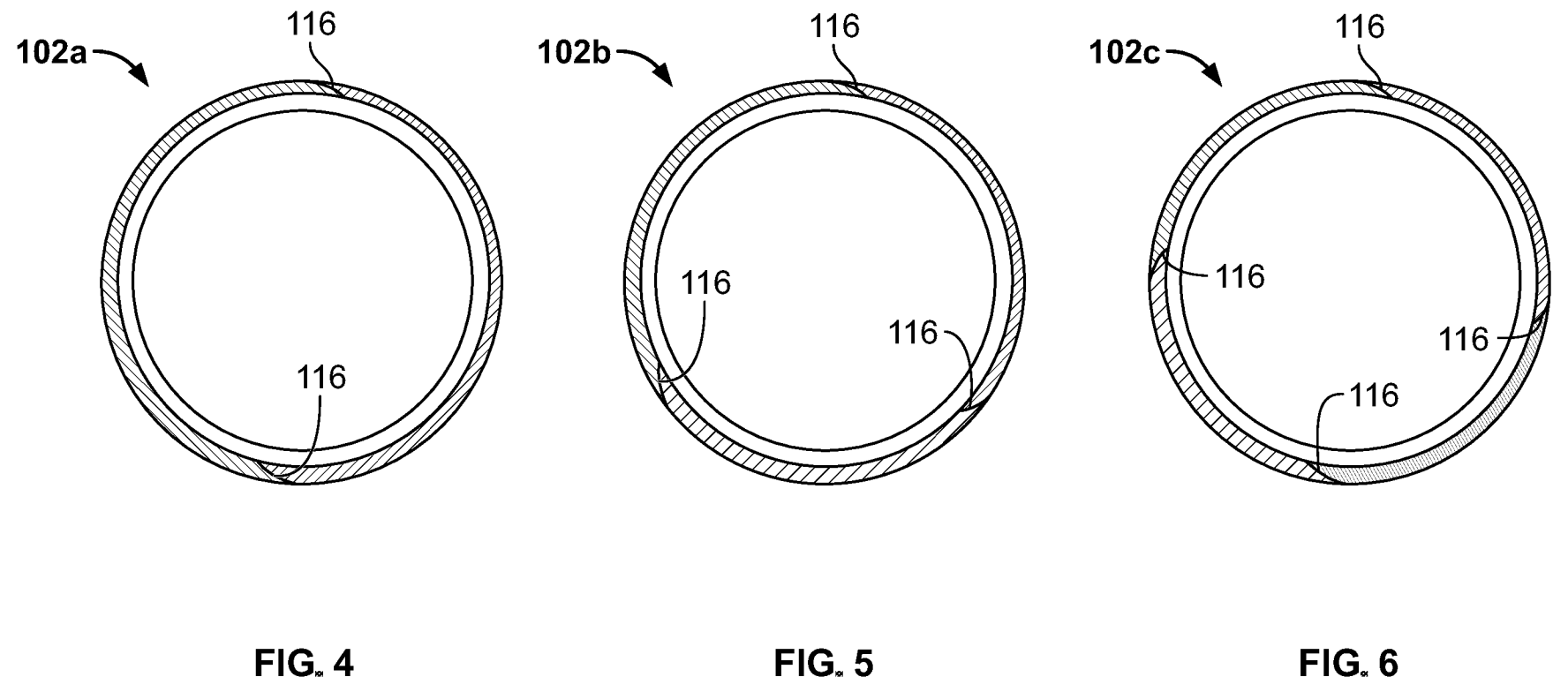

Referring briefly to FIGS. 4-6, a first configuration of the first pipe 102a has a multi-start thread with two thread starts 116. FIG. 5 shows an end view of a second configuration of the first pipe 102b with three thread starts 116. FIG. 6 shows an end view of a third configuration of the first pipe 102c with four thread starts 116. The collar can have a corresponding number of thread starts. As shown in FIG. 4, the two-start thread has two thread starts 116 oriented symmetrically 180° apart from one another. As shown in FIG. 5, the three-start thread has three thread starts 116 oriented 120° apart from one another. As shown in FIG. 6, the four-start thread has three thread starts 116 oriented 90° apart from one another. The multi-start thread allows the first and second pipes 102, 104 to threadedly engage the collar 106 quickly, with less than one complete turn. The multi-start threads can reduce the torque requirement for make-up and break out. For instance, full make-up of the connection can be achieved with as low as a quarter of a full turn. In addition, the low torque requirement reduces the risk of galling the connection during make up.

Referring back to FIG. 1, the second pipe 104 is the same as the first pipe 102. For example, the second pipe 104 has an external thread 109 and rim 113 both of which are the same as or similar to the external thread 108 and rim 112 of the first pipe 102. The second pipe 104 is threaded to the opposite side of the collar 106 to bear against the other side of the mid-shoulder 115 of the collar 106 to form a second seal. The second pipe 104 has the same characteristics as the first pipe 102 and therefore the features of the first pipe 102 and its connection with the coupling 106 as described above are the same for the second pipe 104.

The collar 106 has a first internal thread 138 and a second internal thread 140. The first internal thread 138 corresponds with the external thread 108 of the first pipe 102 and the second internal thread 140 corresponds with the external thread 109 of the second pipe 104. For example, the threads 138, 140 are also slanted square threads and change in width to correspond with the threads of the two pipes 102, 104.

The mid-shoulder 115 of the collar 106 is an inwardly-projecting annular shoulder or protrusion that is disposed between the two threads 138, 140. The shoulder 115 has two bearing surfaces that face away from each other and each bear, with the threaded connection 105 formed, against a respective one of the first and second rims 112, 113. Turbulent flow across the connection can increase the risk of erosion. The shoulder 115 allows the two rims of the pipes 102, 104 (from both sides i.e. mill and field ends) to not contact each other while closing the gap (with the shoulder) between the two rims to eliminate internal diameter variation. Such a connection can result in steady state flow across the connection (or less turbulent flow), which can reduce the risk of erosion across the connection.

Referring to FIG. 3, the collar 106 or the pipes 102, 104 have a seal ring 132 (O-ring) that forms a seal at the end of the threads. For example, the pipes 102, 104 have two external seal rings 132 that form a seal with the collar 106. When the connection 105 is formed, each of the two external seal rings 132 reside between external surfaces of the first and second pipes 102, 104 and respective internal surfaces of the collar 106 to form the seal.

Figure 7:
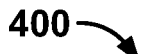
FIG. 7 is a flow chart of an example method of using a pipe assembly.

FIG. 7 shows a flow chart of an example method that includes connecting a first pipe to a collar. The first pipe has a first external thread and a first rim. The collar has a first internal thread, a second internal thread, and an inwardly-projecting annular shoulder residing between the first internal thread and the second internal thread. The shoulder has two bearing surfaces facing away from each other. Connecting the first pipe to the collar includes threadedly coupling the first external thread to the first internal thread such that the first rim forms, with one of the two bearing surface, a first seal (405). The method also includes connecting a second pipe to the collar. The second pipe has a second external thread and a second rim. Connecting the second pipe to the collar includes threadedly coupling the second external thread to the second internal thread of the collar such that the second rim forms, with the other one of the two bearing surfaces, a second seal (410).

Although the following detailed description contains many specific details for purposes of illustration, it is understood that one of ordinary skill in the art will appreciate that many examples, variations and alterations to the following details are within the scope and spirit of the disclosure. Accordingly, the exemplary implementations described in the present disclosure and provided in the appended figures are set forth without any loss of generality, and without imposing limitations on the claimed implementations.

Although the present implementations have been described in detail, it should be understood that various changes, substitutions, and alterations can be made hereupon without departing from the principle and scope of the disclosure. Accordingly, the scope of the present disclosure should be determined by the following claims and their appropriate legal equivalents.

The singular forms "a", "an" and "the" include plural referents, unless the context clearly dictates otherwise.

As used in the present disclosure and in the appended claims, the words "comprise," "has," and "include" and all grammatical variations thereof are each intended to have an open, non-limiting meaning that does not exclude additional elements or steps.

As used in the present disclosure, terms such as "first" and "second" are arbitrarily assigned and are merely intended to differentiate between two or more components of an apparatus. It is to be understood that the words "first" and "second" serve no other purpose and are not part of the name or description of the component, nor do they necessarily define a relative location or position of the component. Furthermore, it is to be understood that that the mere use of the term "first" and "second" does not require that there be any "third" component, although that possibility is contemplated under the scope of the present disclosure.

What is claimed is:

1. A pipe assembly, comprising:
a first pipe comprising a first external thread and a first rim comprising a bearing surface;
a second pipe comprising a second external thread and a second rim comprising a bearing surface; and
a collar configured to be threadedly coupled to the first pipe and the second pipe to form a threaded connection, the collar comprising a first internal thread corresponding with and configured to be threadedly coupled to the first external thread, and a second internal thread corresponding with and configured to be threadedly coupled to the second external thread, the collar comprising an inwardly-projecting annular shoulder residing between the first internal thread and the second internal thread, the shoulder comprising two bearing surfaces facing away from each other and each bearing, with the threaded connection formed, against a respective one of the bearing surfaces of the first and second rims;
wherein each of the first and second external threads comprises a crest of constant diameter along a length of the first and second external threads exclusive of at least one thread of the first external thread and at least one thread of the second external thread; and
each of the first and second external threads comprises a last thread opposite the respective rims of the first and second pipes, each last thread defining, in cross section, a height greater than a height of a rest of the first and second external threads.

2. The pipe assembly of claim 1, wherein the first pipe, the second pipe, and the collar are made of a non-metallic material.

3. The pipe assembly of claim 2, wherein the non-metallic material comprises at least one of reinforced fiber glass or carbon fibers.

4. The pipe assembly of claim 1, wherein each last thread comprises a height that is at least 0.001 inches greater than a height of the rest of the first and second external threads.

5. The pipe assembly of claim 1, further comprising two external seal rings, each of the two external seal rings residing between external surfaces of the first and second pipes and respective internal surfaces of the collar to form a seal, the two external seal rings preventing, with the external seal rings, fluid from flowing across the threaded connection.

6. The pipe assembly of claim 1, wherein the first and second external threads comprise chamfered crests and the first and second internal threads comprises chamfered crests.

7. The pipe assembly of claim 1, wherein the first and second external threads each comprises a multi-start thread with two or more thread starts and the collar comprises a corresponding number of thread starts, allowing the first and second pipes to threadedly engage the collar with less than one complete turn.

8. The pipe assembly of claim 1, wherein each bearing surface of the shoulder comprises an internal seal ring configured to bear against and form, with the threaded connection formed, a seal with a respective one of the first and second rims, the internal seal rings forming a dual seal with the respective rims.

9. The pipe assembly of claim 1, further comprising a dope pocket at a first thread of the first and second internal threads, the dope pocket configured to retain lubricant to release stress from the first internal thread during make up of the threaded connection.

10. The pipe assembly of claim 1, wherein each of the first and second external threads comprise a square thread slanted with respect to a plane orthogonal to a central longitudinal axis of the first and second pipes, the square thread comprising a load flank defining an angle of between negative 0.1° and negative 10° with respect to the plane and a stab flank defining an angle of between 5° and 15° with respect to the plane.

11. The pipe assembly of claim 1, wherein each of the first and second internal threads comprise a root of constant diameter exclusive of at least a last root of each of the first and second internal threads.

12. An assembly, comprising:
a tubular body configured to be threadedly coupled to a first pipe comprising a first rim and a second pipe comprising a second rim to form a connection, the tubular body comprising a first internal thread, a second internal thread, and an inwardly-projecting annular shoulder residing between the first internal thread and the second internal thread, the inwardly-projecting annular shoulder comprising two bearing surfaces facing away from each other and each bearing, with the connection formed, against a respective one of the first and second rims;
wherein each of the first and second internal threads comprise a root of constant diameter exclusive of at least a last root of each of the first and second internal threads; and
each of the first and second internal threads comprises a width that increases from the inwardly-projecting annular shoulder to a last thread of the first and second internal threads, the width increasing uniformly across a length of the first and second internal threads.

13. The assembly of claim 12, wherein each bearing surface comprises an annular seal element configured to bear against and form, with the threaded connection formed, a seal with a respective one of the first and second rims.

14. The assembly of claim 12, further comprising two external seal rings, each of the two external seal rings residing between external surfaces of the first and second pipes and respective internal surfaces of the collar to form a seal, the two external seal rings preventing, with the connection formed, fluid from flowing across the connection.

15. A method, comprising:
connecting a first pipe to a collar, the first pipe comprising a first external thread and a first rim, the collar comprising a first internal thread, a second internal thread, and an inwardly-projecting annular shoulder residing between the first internal thread and the second internal thread and comprising two bearing surfaces facing away from each other, wherein connecting the first pipe to the collar comprises threadedly coupling the first external thread to the first internal thread such that a bearing surface of the first rim forms, with one of the two bearing surfaces of the shoulder, a first seal; and
connecting a second pipe to the collar, the second pipe comprising a second external thread and a second rim, wherein connecting the second pipe to the collar comprises threadedly coupling the second external thread to the second internal thread of the collar such that a bearing surface of the second rim forms, with the other one of the two bearing surfaces of the shoulder, a second seal;
wherein each of the first and second external threads comprise a crest of constant diameter along a length of the first and second external threads exclusive of at least one thread of the first external thread and at least one thread of the second external thread, and connecting the first pipe to the collar comprises threadedly coupling the first pipe with the collar until the one thread engages the collar; and
each of the first and second external threads comprises a last thread opposite the respective rims of the first and second pipes, each last thread defining, in cross section, a height greater than a height of a rest of the first and second external threads.

16. The method of claim 15, wherein connecting the first pipe comprises threadedly coupling the first pipe with the collar until the first rim bears against a seal ring disposed between the first rim and the inwardly-projecting annular shoulder to form the first seal.

17. A pipe assembly, comprising:
a first pipe comprising a first external thread and a first rim comprising a bearing surface; a second pipe comprising a second external thread and a second rim comprising a bearing surface; and
a collar configured to be threadedly coupled to the first pipe and the second pipe to form a threaded connection, the collar comprising a first internal thread corresponding with and configured to be threadedly coupled to the first external thread, and a second internal thread corresponding with and configured to be threadedly coupled to the second external thread, the collar comprising an inwardly-projecting annular shoulder residing between the first internal thread and the second internal thread, the shoulder comprising two bearing surfaces facing away from each other and each bearing, with the threaded connection formed, against a respective one of the bearing surfaces of the first and second rims;

wherein the one thread of the first external thread comprises a last thread of the first external thread, and the one thread of the second external thread comprises a last thread of the second external thread, the last threads opposite the respective rims of the first and second pipes, each last thread defining, in cross section, a height greater than a height of a rest of the first and second external threads; and wherein the first and second external threads comprise a crest of constant diameter along a length of the first and second external threads up to the last thread.

18. The pipe assembly of claim 17, wherein each of the first and second external threads comprises a root of constant diameter.

19. The pipe assembly of claim 17, wherein the first pipe, the second pipe, and the collar are made of a non-metallic material.

20. A pipe assembly, comprising:

a first pipe comprising a first external thread and a first rim comprising a bearing surface; a second pipe comprising a second external thread and a second rim comprising a bearing surface; and a collar configured to be threadedly coupled to the first pipe and the second pipe to form a threaded connection, the collar comprising a first internal thread corresponding with and configured to be threadedly coupled to the first external thread, and a second internal thread corresponding with and configured to be threadedly coupled to the second external thread, the collar comprising an inwardly-projecting annular shoulder residing between the first internal thread and the second internal thread, the shoulder comprising two bearing surfaces facing away from each other and each bearing, with the threaded connection formed, against a respective one of the bearing surfaces of the first and second rims;

wherein each bearing surface of the shoulder comprises an internal seal ring configured to bear against and form, with the threaded connection formed, a seal with a respective one of the first and second rims, the internal seal rings forming a dual seal with the respective rims;

wherein the inwardly-projected shoulder defines, in cross-sectional side view, a tapered surface and each of the internal seal rings comprises a trapezoidal cross-section defining a leg side tapered to correspond with the tapered surface of the inwardly-projected shoulder; and each of the first and second external threads comprises a last thread opposite the respective rims of the first and second pipes, each last thread defining, in cross section, a height greater than a height of a rest of the first and second external threads.

21. The pipe assembly of claim 20, wherein each of the first and second external threads comprises a root of constant diameter.

22. The pipe assembly of claim 20, wherein the first pipe, the second pipe, and the collar are made of a non-metallic material.

23. A pipe assembly, comprising:

a first pipe comprising a first external thread and a first rim comprising a bearing surface;

a second pipe comprising a second external thread and a second rim comprising a bearing surface; and a collar configured to be threadedly coupled to the first pipe and the second pipe to form a threaded connection, the collar comprising a first internal thread corresponding with and configured to be threadedly coupled to the first external thread, and a second internal thread corresponding with and configured to be threadedly coupled to the second external thread, the collar comprising an inwardly-projecting annular shoulder residing between the first internal thread and the second internal thread, the shoulder comprising two bearing surfaces facing away from each other and each bearing, with the threaded connection formed, against a respective one of the bearing surfaces of the first and second rims;

wherein each of the first and second external threads comprises a crest of constant diameter along a length of the first and second external threads exclusive of at least one thread of the first external thread and at least one thread of the second external thread; and each of the first and second threads comprises a width that increases from the respective rim to a last thread of the first and second threads.

24. The pipe assembly of claim 23, wherein the width increases uniformly across a length of the first and second threads.

* * * * *